United States Patent Office 3,575,713
Patented Apr. 20, 1971

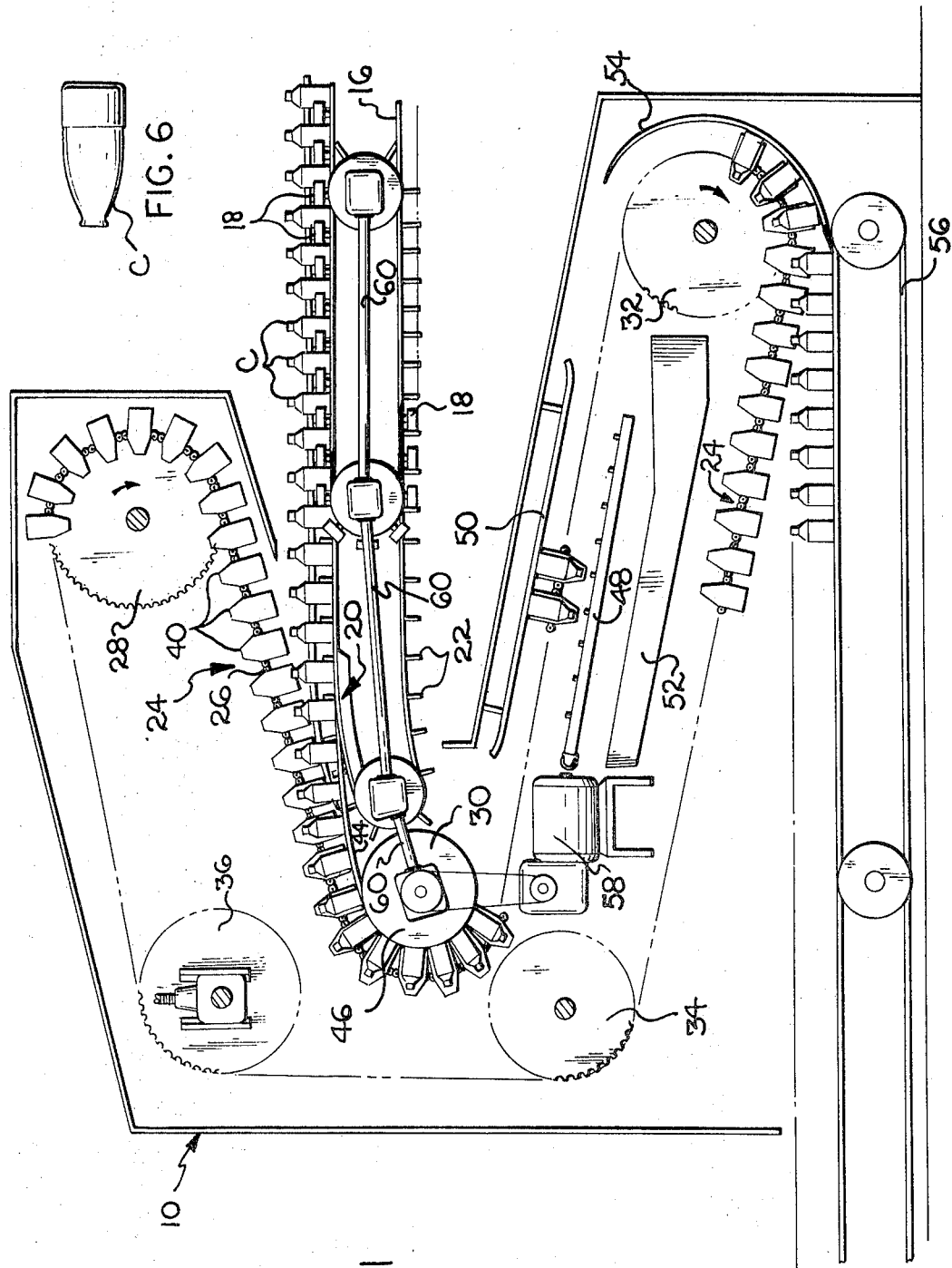

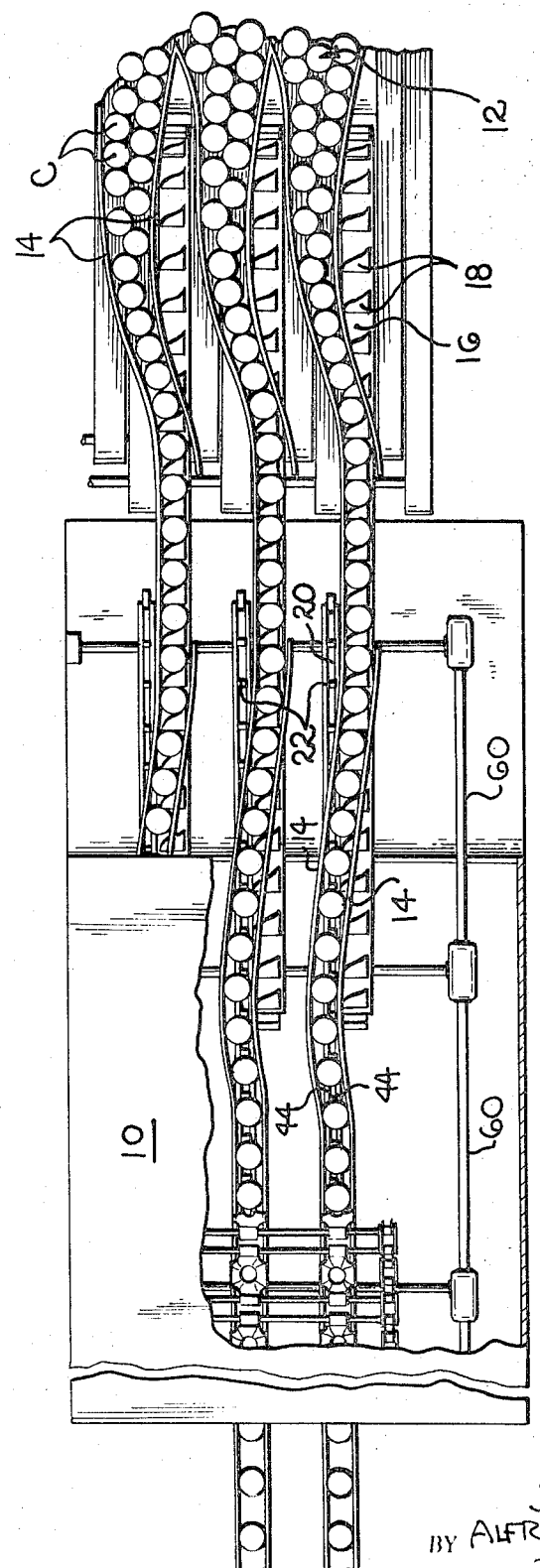

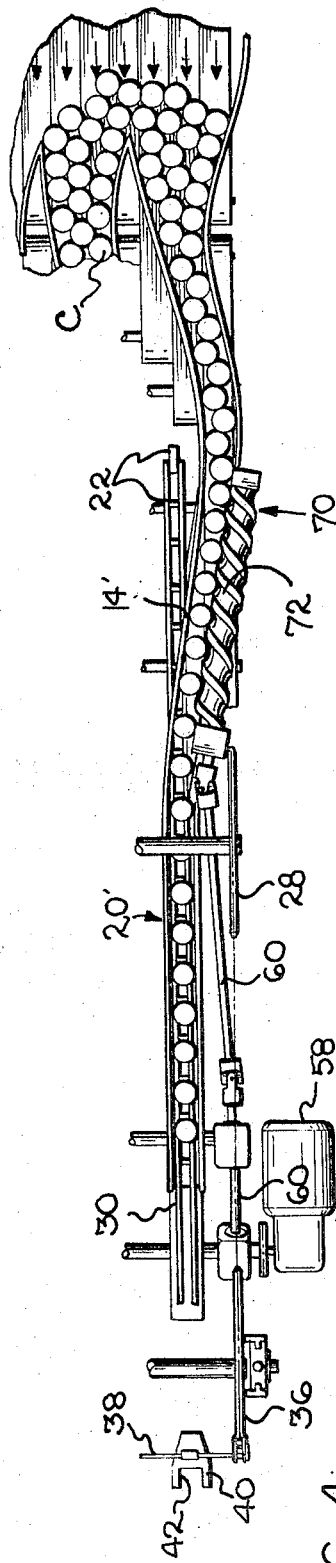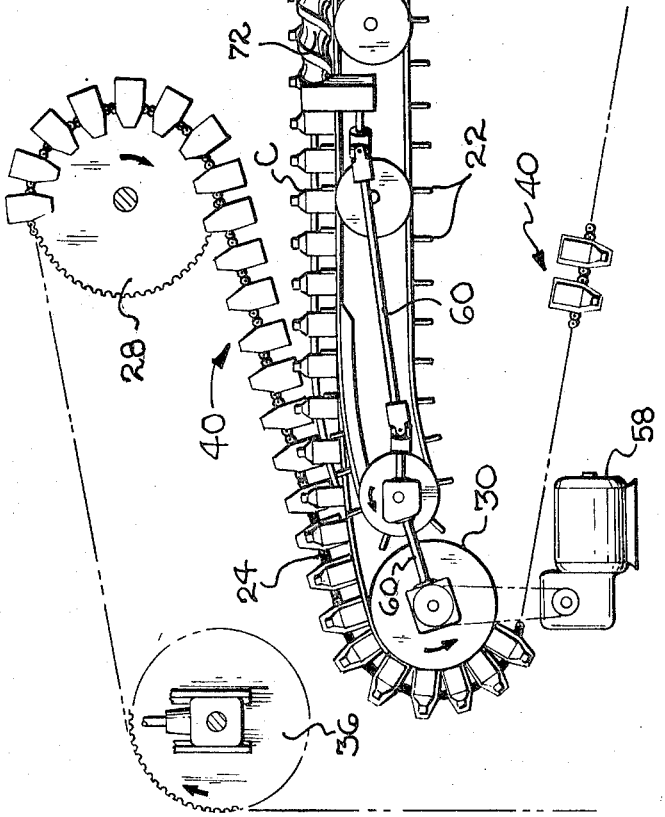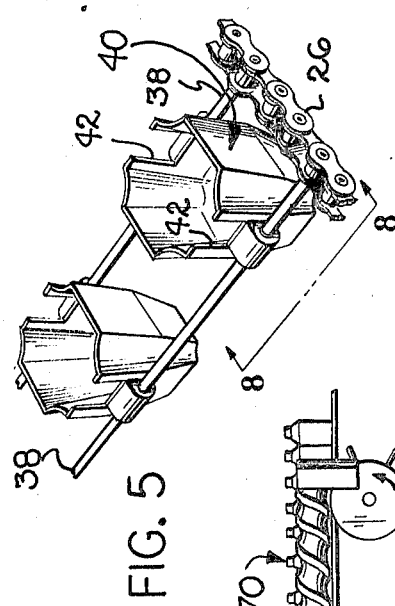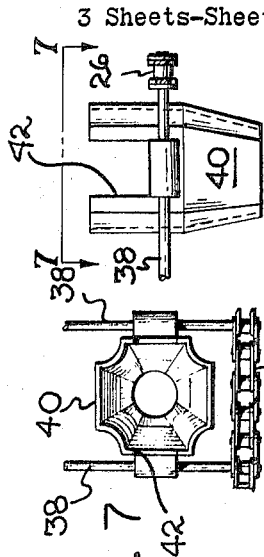

3,575,713
METHOD AND APPARATUS FOR CLEANING
CONTAINERS
John R. Duff, Toledo, and Alfred S. Decker, Lancaster,
Ohio, assignors to Owens-Illinois, Inc.
Filed July 31, 1969, Ser. No. 846,326
Int. Cl. B08b 9/00
U.S. Cl. 134—23                    14 Claims

ABSTRACT OF THE DISCLOSURE

A method and apparatus for cleaning hollow articles such as bottles as they are taken from storage and fed into a filling line in a bottling plant. Bottles are transferred in individual bottle receiving pockets from an infeed conveyor through a rinser to a discharge conveyor which may be at a different level than the infeed conveyor. The pockets are on an endless conveyor and are constructed to permit loading and unloading of the pockets continuously without abusing the bottles. The bottles are loaded into the pockets by synchronized merging of the paths of the pockets and bottles on the infeed conveyor. The pockets, while moving with the bottles are lowered onto the bottles while the bottles are upright and then pass around a direction changing sprocket to invert the pockets to support the bottle's mouth downwardly with the mouth exposed to an upwardly directed rinsing spray. After rinsing, the pockets pass around another sprocket, after which the bottles drop from the pockets onto a discharge conveyor.

BACKGROUND OF THE INVENTION

Apparatus and methods have been employed previously to rinse or wash articles such as bottles while transporting the bottles in pockets of a pocket chain. In known apparatus of this type, the bottles or other containers usually are indexed into and out of the pockets by means of some type of cam mechanism. It has been found that such indexing of the containers during loading and unloading of the pockets tends to damage or otherwise abuse the containers. Also, there is not a smooth and continuous flow of containers through the apparatus.

SUMMARY OF THE INVENTION

The present invention provides an apparatus for cleaning containers while transporting them in pockets of a pocket conveyor wherein containers are loaded into and unloaded from the pockets in a completely smooth and continuous manner without any indexing of the containers relative to the pockets. The containers, which may be at least partly made of glass, are handled very gently by the apparatus and are not subjected to any abuse. One embodiment of the invention includes vertically spaced generally horizontal infeed and discharge conveyors. An endless pocket conveyor consisting of a plurality of serially connected open-ended pockets is arranged to pick up containers from the infeed conveyor, carry them through a rinsing station, and deposit them on the discharge conveyor to be conveyed away serially. The pocket conveyor includes a first run directed angularly downwardly toward the infeed conveyor so that in operation one open end of each pocket advances downwardly about an upright container to enclose the container in the pocket with the open mouth of the container directed toward the one open end of the pocket. The pocket conveyor goes downwardly around a sprocket into a second run in which the open mouths of the containers are directed generally downward and in which the articles are transported past the cleaning station. A fluid discharge device discharges rinsing fluid into the mouths of the containers in the pockets, and the fluid drains from the containers by gravity due to the downward orientation of their mouths. The pocket chain goes downwardly around another sprocket into a third run which advances angularly upwardly away from the discharge conveyor so that in operation each container is deposited on the discharge conveyor by gravity from one of the pockets as that recedes upwardly away from the article.

Objects of this invention will appear in the following description and appended claims, reference being had to the accompanying drawings forming a part of this specification wherein like reference characters designate corresponding parts in the several views.

On the drawings:

FIG. 1 is a side elevational view, partly broken away, of a container rinsing apparatus in accordance with one embodiment of the invention;

FIG. 2 is a plan view, partially broken away, showing the general outline of the rinsing apparatus;

FIG. 3 is a side elevational view, partly cut away, of a modified form of the invention;

FIG. 4 is a fragmentary plan view of the machine of FIG. 3;

FIG. 5 is a perspective view of two pockets in side-by-side relationship and in an inverted position illustrating how the pocket chain may be made up of multiple rows of pockets;

FIG. 6 is a view of a container which may be handled by the apparatus;

FIG. 7 is a plan view of the lower open end of one of the pockets taken along line 7—7 of FIG. 8; and FIG. 8 is an elevational view of one of the pockets in the inverted position shown on FIG. 5.

Referring first to FIGS. 1 and 2, a container rinser embodying the present invention includes a rinser housing designated generally 10 through which the containers are transported by a conveying system. As best seen in FIG. 2, the containers are fed in an upright position in random grouping along an infeed conveyor designated generally 12 from right to left as viewed in FIGS. 1 and 2. The randomly grouped containers are divided and formed into three single lines by diverter rails 14 which then guide the single line of containers into operative relationship on the spacing conveyor, such as 16. Because the structure employed in each of the separated lines is identical, only one of the lines is described in detail, it being apparent that the number of lines actually employed is a matter of choice. The spacing conveyor 16 consists simply of an endless conveyor upon which are mounted a plurality of uniformly-spaced, wedge-shaped separating elements 18, the spacing between adjacent elements 18 on conveyor 16 accommodating only a single container. Guide rails 14 guide the containers onto the endless belt of conveyor 16 between two adjacent spacing elements 18 and the conveyor 16 advances the articles in uniformly spaced relationship into side-by-side relationship with an endless belt transfer conveyor 20. Spacing conveyor 16 and transfer conveyor 20 have their opposite ends overlap with each other, and during the transit of this region of overlap, the guide rails 14 deflect the containers laterally of their path of movement from support upon the belt of conveyor 16 onto the belt of conveyor 14. The two belts are, of course, driven at the same speed. The belt of transfer conveyor 20 is formed with a series of uniformly spaced vertical projections 22 to assure positive positioning of the containers upon the belt 20. Transfer conveyor 20 advances the containers to the left into underlying relationship with one run of a pocket conveyor designated generally 24.

Pocket conveyor 24 includes a pair of spaced horizontal endless chains such as 16 (FIG. 5) which are operatively trained about a series of sprockets 28, 30, 32, 34 and 36, the sprockets being mounted in pairs upon common shafts. Referring to FIG. 5, rods 38 are mounted upon and extended between the pair of chains 26 and pivotally support bottle receiving pockets designated generally 40 between the chains. The pockets 40 consist of a body which may be made from a molded plastic material. The pocket 40 is open at its opposite ends, and its interior is shaped to fit over the container body and to support the container within the pocket in an inverted position. The pocket 40 is notched as at 42 on its leading and trailing sides to provide a clearance for the neck of the container as the pocket chain moves into and out of relationship with the containers. The interior surface of the pocket is so designed that the initial contact between the container and interior surface of the pocket is made at the shoulder portion of the container as the container and pockets move into convergent relationship with each other near the discharge end of transfer conveyor 20.

Returning now to FIG. 1, in that run of the pocket chain between sprockets 28 and 30, the pockets 40 are carried in their inverted position with the wider open end of the pocket facing downwardly. Movement of the pocket chain conveyor 24 and transfer conveyor 20 is synchronized so that the containers advanced by transfer conveyor 20 are in alignment with the pockets on conveyor 24. As the containers approach the discharge end of transfer conveyor 20, support of the containers is transferred to plural spaced, support rails 44 as the path of the pockets on conveyor 24 moves into convergence with the path of the containers along transfer conveyor 20. As the pockets and containers move to the left as viewed in FIG. 1, the pocket lowers downwardly to capture the bottle and advancement of the containers to the left along guide rails 44 is taken over by the pockets as the projecting webs 22 of the transfer conveyor are guided downwardly below the supporting surface of rails 44. Support rails 44 continue to support the container until the conveyor 24 drives the container beyond the end of rails 44 onto the peripheral surface of a drum 46 mounted upon the same shaft and rotatable with the chain guiding sprockets 30. As best seen in FIG. 1, the pockets and containers move in a counterclockwise direction with the drum and, as the path of the pockets pass beyond the lower portion of drum 46, the containers are supported in inverted position within the pockets.

The containers are carried by the pockets 40 along the run of the pocket conveyor extending between sprockets 30 and 32 with the containers C in an inverted position and with the container mouths exposed through the open bottom of the pockets. While passing along the run between sprocket 30 and sprocket 32, the containers pass above an elongate spray head 48 which sprays upwardly directed jets of a suitable rinsing solution into the interior of the containers. During the transit of the containers along spray nozzle head 48, the bottoms of the containers are engaged by an overlying back-up plate 50 which prevents the force of the spray jets from washing the containers upwardly out of the pockets. A drip pan 52 is mounted below the spray head 48 and extends somewhat beyond the downstream end of the spray head to collect rinsing solution which readily drains from the containers, by virtue of their inverted position.

As the rinsed containers are carried by the pocket conveyor 24 around sprocket 32, a second back-up plate 54, conformed to the path of the loaded pockets, maintains the containers in the pockets as the path of the pocket chain passing around sprockets 32 again inverts the pockets. Back-up plate 54 is extended to provide a smooth transition of the path of the container bottoms onto the carrying run of an endless belt discharge conveyor designated generally 56 whose upper carrying run is driven from right to left as viewed in FIG. 1 at a speed synchronized with the speed of the pocket conveyor. As the pocket conveyor passes into overlying relationship with the discharge conveyor 56, the pockets move onto an upwardly inclined run of conveyor 24 extending from sprockets 32 to sprockets 34. Because of the inverted position of the pockets as the pocket conveyor leaves sprockets 32, the containers can drop freely from the pockets onto the support surface provided by the upper carrying run of discharge conveyor 56 as the pockets are carried upwardly out of engagement with the containers. The notches 42 in the pockets during this separation provide clearance for the container necks to prevent interference during the separation because of the slight difference in the horizontal velocity components of the pockets and containers due to the inclination of the run of pocket conveyor 24 from the horizontal.

It is believed apparent that proper functioning of the rinsing system described above relies heavily on synchronization of the various conveyors. While many conventional, commercially available devices may be employed for this purpose, synchronization between spacing conveyor 16, transfer conveyor 20 and pocket conveyor 24 may be achieved by employing a common drive powered as at 58 by suitable drive motor mechanically coupled to drive the three last-mentioned conveyors as by a suitable drive train designated generally 60.

Referring now to FIGS. 3 and 4, there are disclosed views of a modified form of machine corresponding generally to FIGS. 1 and 2, but differing primarily in the spacing conveyor. In the embodiment of FIG. 4, the function of the previously described spacing conveyor 16 is performed by a feed screw conveyor designated generally 70 by means of which containers are advanced onto the transfer conveyor 20' in uniformly spaced relationship. As best seen in FIG. 4, the axis of the feed screw 72 of conveyor 70 is inclined with respect to the path of transfer conveyor 20' and the screw is related to the opposed guide rail 14' so that the containers, during their movement along the screw are spaced from each other by the flight of the screw.

Apart from the employment of a screw conveyor 70 in place of the belt type spacing conveyor 16, the remaining portions of the machine of FIGS. 3 and 4 are identical to the previously described embodiment.

Having described exemplary embodiments of our invention, we claim:

1. Apparatus for cleaning hollow articles having an open mouth comprising first transport means for transporting the articles serially along a feed path with the articles arranged at a predetermined center-to-center spacing, a plurality of pockets connected together in chainlike fashion at the same spacing as said articles to form an endless pocket chain, each of said pockets having a hollow side wall and an opening at each end thereof, the side wall being shaped interiorly to retain one of said articles therein, means directing a first run of said pocket chain angularly toward said first transport means so that in operation one open end of each pocket advances about one of said articles to enclose the article in the pocket with the mouth of the article adjacent to the other open end of the pocket, means directing a second run of said pocket chain with said other ends of said pockets directed downward past a cleaning station, fluid discharge means at said cleaning station for discharging cleaning fluid into the mouths of articles in said pockets whereby the cleaning fluid may drain from said articles due to the downward orientation of their mouths, second transport means for transporting the articles away from said pocket chain, means directing a third run of said pocket chain close to and angularly away from said second transport means so that in operation each article is deposited on said second transport means from one of said pockets and that pocket recedes away from the article, means to return said pocket chain to said first run, and means to drive said pocket chain.

2. Apparatus as claimed in claim 1 further including backup means supported adjacent said second run of said pocket chain at the side thereof opposite said fluid discharge means to block said one open end of each pocket as said pocket advances past said backup means and thereby prevent an article from being forced out of the pocket by the fluid discharge.

3. Apparatus as claimed in claim 1 in which said first transport means includes a first generally horizontally extending conveyor at a first level, said second transport means includes a second generally horizontally extending conveyor at a second level above or below said first level, said first run of said pocket chain is inclined relative to said first conveyor, said third run of said pocket chain is inclined relative to said second conveyor, and said second run of said pocket chain is between said first and third runs.

4. Apparatus as claimed in claim 3 in which said first transport means includes an endless chain having equally spaced projections thereon and positioned adjacent said conveyor so that said projections may engage articles on said conveyor to space the same at said predetermined spacing, and means to drive said chain.

5. Apparatus as claimed in claim 3 in which said second transport means is below said first transport means and said means for directing said first, second and third runs of said pocket chain includes a first sprocket positioned above said first conveyor, a second sprocket positioned adjacent a discharge end of said first conveyor, and a third sprocket positioned between said conveyors adjacent said second conveyor, said sprockets being staggered so that said pocket chain traverses the same in a generally S-shaped or Z-shaped configuration and then returns.

6. Apparatus as claimed in claim 1 in which each of said pockets has recesses at the front and rear thereof relative to the direction of travel of said pocket chain and extending longitudinally of said pocket from said one end thereof to provide partial clearance for an article while the other sides of said pocket partially enclose the article when said pocket advances toward and recedes from said article.

7. Apparatus as claimed in claim 6 in which each of said pockets comprises a generally tubular member having openings at opposite ends thereof and said recesses on front and rear sides thereof extending from one end thereof, the other end of said member being restricted on the inside thereof to retain said article in said pocket.

8. Apparatus for cleaning hollow articles having an open mouth by discharging cleaning fluid into the articles at a cleaning station while conveying the articles continuously from a first transport means at one level to a second transport means at another level below that of said first transport means, the articles being transported serially by said first transport means at a predetermined spacing, said apparatus including in combination an endless pocket chain comprised of a plurality of pockets connected in a series at the same spacing as said articles, each of said pockets having openings at opposite ends thereof and being shaped to retain one of said articles therein with the mouth of the article adjacent an opening, said pockets being oriented in said chain with their openings at opposite sides of the chain, means forming a first run of said pocket chain directed angularly downward toward said first transport means so that in operation one open end of each pocket advances about one of said articles to enclose the article therein, means forming a second run of said pocket chain directed angularly downward with said pockets inverted relative to said first run so that in operation the other open ends of the pockets and the mouths of the articles in said second run are directed downward, fluid discharge means adjacent said second run of said pocket chain for directing fluid into the mouths of articles in said pockets with the fluid draining by gravity from said articles, means forming a third run of said pocket chain directed close to and angularly upward away from said second transport means with said one open end of said pockets directed downward so that in operation each article is deposited on said second transport means from one of said pockets and that pocket recedes away from the article, means to return said pocket chain to said first run, and means to drive said pocket chain.

9. Apparatus for rinsing bottles while transporting the bottles automatically, said apparatus comprising a first generally horizontal transport means for conveying bottles serially in a first direciton with their mouths up and at a predetermined spacing, a second generally horizontal transport means located below said first transport means for conveying bottles in said first direction, a pocket chain comprised of a plurality of pockets connected together serially at said spacing, each of said pockets having a hollow side structure with an opening at each end thereof and being shaped to retain a bottle therein, a first sprocket above said first transport means, a second sprocket adjacent a discharge end of said first transport means, a third sprocket between said first and second transport means, and return sprocket means, said pocket chain traversing said first and second sprockets and extending between the same at an angle relative to said first transport means so that in operation one open end of each pocket advances about a bottle on said first transport means to enclose the bottle in the pocket with the mouth directed toward the other open end of the pocket, said pocket chain traversing said second and third sprockets and extending therebetween with said other ends of said pockets directed generally downwardly, fluid discharge means below the portion of said pocket chain between said second and third pockets for discharging rinsing fluid into the mouths of bottles in said pockets whereby the fluid may drain from the bottles by gravity due to the downward orientation of their mouths, said pocket chain traversing said third sprocket and said return sprocket means and extending therebetween at an angle relative to said second transport means so that in operation each bottle is deposited on said second transport means from one of said pockets and that pocket moves away from said second transport means, backup means associated with said third sprocket for retaining bottles in said pockets until they are discharged onto said second transport means, and means to drive said pocket chain about said sprockets and sprocket means.

10. The apparatus as claimed in claim 9 including additional pocket chains constructed the same as said first-named pocket chain and traversing said first, second and third sprockets and said return sprocket means in the same manner as said first-named pocket chain and in side-by-side relationship therewith and with each other, so that a plurality of rows of bottles may be transported by said first transport means and transferred past said fluid discharge means by said pocket chains to said second transport means.

11. A method of cleaning articles while transporting the same serially with a pocket chain, said method comprising the steps of transporting a series of hollow articles having an open mouth along a generally horizontal path with the mouths thereof up, advancing a pocket chain at an angle toward said feed path with said pocket chain consisting of a plurality of serially connected pockets each having a hollow side wall and openings at opposite ends thereof so that one open end of each pocket advances about one of said articles to enclose the article therein with the mouth of the article directed toward the other open end of the pocket, advancing said pocket chain through a turn to direct said other ends of said pockets generally downward, said pockets each being shaped to retain one of said articles therein when said other end is directed downward, directing cleaning fluid into the mouths of articles in said pockets while said other ends are directed downward with the fluid draining by gravity from said articles, advancing said pocket chain through another turn and angularly away from a second generally horizontal feed path to discharge an article from each of said pockets, and transporting the discharged articles along said second feed path.

12. Bottle rinsing apparatus comprising a pocket conveyor having an endless chain of uniformly spaced bottle receiving pocket members movable along an endless path, each of said pocket members including an open-ended tubular element adapted to be moved freely downwardly onto a bottle into engagement with the bottle shoulder to support the bottle in the pocket member when the bottle and pocket member are in an inverted position and to release the bottle when the bottle and pocket member are in an upright position, sprocket means defining a portion of said endless path wherein said pocket members pass successively along a first downwardly inclined run in a generally upright position, then downwardly about a portion of the periphery of a first direction changing sprocket to a second downwardly inclined run along which said pocket members are in a generally inverted position, and thence downwardly about a second direction changing sprocket to an upwardly inclined run along which said sprocket members are in a generally upright position, infeed conveyor means for feeding bottles in an upright position in a uniformly spaced relationship corresponding and synchronized with that of said pocket members along an infeed path merging with the path of movement of said pocket members along said first downwardly inclined run whereby the bottles are successively inserted into the pocket members prior to movement of the pocket members about said first sprocket, rinsing means for rinsing bottles supported in said pocket members during their transit of said second run, discharge conveyor means extending from said second sprocket in horizontal underlying relationship to said upwardly inclined run, and means for retaining bottles in said pocket members during movement of said pocket members about said first and second sprockets.

13. Apparatus as defined in claim 12 wherein said tubular element is conformed to the shape of said bottle to support the bottle, when in an inverted position with the bottle mouth projecting from one end of the tubular member, and means defining clearance recesses extending inwardly from the opposite end of said tubular member to permit said tubular member to clear the neck of the bottle during movement of said pocket members into and out of engagement with the bottle.

14. Apparatus as defined in claim 12 wherein said rinsing means comprises means underlying said second run for discharging upwardly directed sprays of a rinsing solution into said bottles, and backup means overlying said second run for retaining bottles in said pocket members against the action of said rinsing means.

References Cited

UNITED STATES PATENTS

| | | | |
|---|---|---|---|
| 807,687 | 12/1905 | Schirmer | 198—131 |
| 2,605,883 | 8/1952 | Thames | 198—33(R4) |
| 3,064,663 | 11/1962 | Sariotti et al. | 198—131 |

FOREIGN PATENTS

| | | | |
|---|---|---|---|
| 198,673 | 7/1958 | Germany | 198—22 |

EVON C. BLUNK, Primary Examiner

S. P. GARBE, Assistant Examiner

U.S. Cl. X.R.

21—79, 80; 134—131, 152; 198—20, 33